US007801863B2

(12) United States Patent
Brown et al.

(10) Patent No.: US 7,801,863 B2
(45) Date of Patent: Sep. 21, 2010

(54) METHOD AND COMPUTER-READABLE MEDIUM FOR FORMULA-BASED DOCUMENT RETENTION

(75) Inventors: Kevin Lane Brown, Woodinville, WA (US); Jason M. Cahill, Woodinville, WA (US); Adrian Brown, Sammamish, WA (US); Ethan D. Gur-esh, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 11/072,658

(22) Filed: Mar. 4, 2005

(65) Prior Publication Data

US 2006/0218198 A1    Sep. 28, 2006

(51) Int. Cl.
*G06F 17/30* (2006.01)
(52) U.S. Cl. ...................................... 707/663
(58) Field of Classification Search ................ 707/200, 707/204, 663
See application file for complete search history.

(56) References Cited

U.S. PATENT DOCUMENTS

| | | | | |
|---|---|---|---|---|
| 4,899,299 A | * | 2/1990 | MacPhail | 707/204 |
| 5,107,419 A | * | 4/1992 | MacPhail | 707/9 |
| 5,495,607 A | * | 2/1996 | Pisello et al. | 707/10 |
| 5,617,568 A | * | 4/1997 | Ault et al. | 707/101 |
| 5,668,958 A | * | 9/1997 | Bendert et al. | 710/305 |
| 5,689,701 A | * | 11/1997 | Ault et al. | 707/10 |
| 5,786,817 A | * | 7/1998 | Sakano et al. | 345/619 |
| 5,813,009 A | * | 9/1998 | Johnson et al. | 707/100 |
| 5,963,925 A | * | 10/1999 | Kolling et al. | 705/40 |
| 5,999,945 A | * | 12/1999 | Lahey et al. | 707/200 |
| 6,052,198 A | * | 4/2000 | Neuhard et al. | 358/1.15 |
| 6,154,753 A | * | 11/2000 | McFarland | 715/221 |
| 6,185,576 B1 | * | 2/2001 | McIntosh | 707/200 |
| 6,490,597 B1 | * | 12/2002 | Singh et al. | 707/204 |

(Continued)

FOREIGN PATENT DOCUMENTS

EP    0 322 130 A    6/1989

(Continued)

OTHER PUBLICATIONS

U.S. Appl. No. 11/274,154, filed Nov. 2005, Brown et al.*

(Continued)

*Primary Examiner*—Neveen Abel Jalil
*Assistant Examiner*—Mark Andrew X Radtke
(74) *Attorney, Agent, or Firm*—Merchant & Gould (57) ABSTRACT

A method and computer-readable medium are provided for formula-based document retention. According to the method, a retention formula and a retention action are defined for one or more items. The retention formula is utilized to calculate a retention date for each item. The retention action specifies the action that should be taken on or after the retention date. The retention date for one or more items is initially calculated using the retention formula for the items. A retention service may be periodically executed to identify any items having a retention date earlier than the current date. If any items are identified that have a retention date earlier than the current date, the retention service recalculates the retention date for these items utilizing the corresponding retention formula. If the recalculated retention date for any item is still prior to the current date, the retention action for the item is executed.

16 Claims, 6 Drawing Sheets

U.S. PATENT DOCUMENTS

| | | | |
|---|---|---|---|
| 6,507,857 B1* | 1/2003 | Yalcinalp | 715/235 |
| 6,704,753 B1 | 3/2004 | Groetzner et al. | |
| 6,842,770 B1* | 1/2005 | Serlet et al. | 709/203 |
| 6,871,345 B1* | 3/2005 | Crow et al. | 717/175 |
| 7,107,416 B2* | 9/2006 | Stuart et al. | 711/159 |
| 7,146,388 B2* | 12/2006 | Stakutis et al. | 707/204 |
| 7,233,959 B2* | 6/2007 | Kanellos et al. | 707/104.1 |
| 7,239,409 B2* | 7/2007 | Parry | 358/1.15 |
| 7,318,009 B2* | 1/2008 | Beam et al. | 702/188 |
| 7,318,066 B2* | 1/2008 | Kaufman et al. | 707/102 |
| 7,353,242 B2* | 4/2008 | Kodama | 707/204 |
| 7,389,536 B2* | 6/2008 | Challener et al. | 726/22 |
| 2003/0093698 A1* | 5/2003 | Challener et al. | 713/202 |
| 2004/0019846 A1* | 1/2004 | Castellani et al. | 715/500 |
| 2004/0122910 A1* | 6/2004 | Douglass et al. | 709/214 |
| 2004/0249871 A1* | 12/2004 | Bazoon | 707/206 |
| 2005/0097260 A1* | 5/2005 | McGovern et al. | 711/100 |
| 2006/0004689 A1* | 1/2006 | Chandrasekaran et al. | 707/1 |
| 2006/0161395 A1* | 7/2006 | Beam et al. | 702/185 |

FOREIGN PATENT DOCUMENTS

WO    WO 00/58865    10/2000

OTHER PUBLICATIONS

European Search Report dated Apr. 7, 2006 cited in EP Application No. 06101269.6.

Skupsky, Donald S., "Applying Records Retention to Electronic Records," LookSmart, http://www.findarticles.com/p/articles/mi_qa3937/is_199907/ai_n8870232/print, 12 pages.

Chinese First Office Action dated Jul. 9, 2010 cited in Application No. 200610004382.0.

* cited by examiner

Use this page to set a retention period in this profile.

Retention Policy

Select the type of retention period. Once you've done this you can select the length of the retention period and the processing action to execute at the end of the period. Tell me more about retention periods.

The type of retention period in this profile is:
- ⦿ None (this content never gets processed)
- ○ A time period based on the item's properties
- ○ A time period set by the document's workflow
- ○ Custom ← 46

Use this page to set a retention period in this profile.

Retention Policy

Select the type of retention period. Once you've done this you can select the length of the retention period and the processing action to execute at the end of the period. More information about retention period types.

Retention Period Settings

Items with this profile are automatically processed when they reach the end of their retention period. Select the length of the retention period and then select the action to have automatically performed at the end of the retention period. More information on retention period settings.

The type of retention period in this profile is:
- ○ None (this content never gets processed)
- ⦿ A time period based on the item's properties
- ○ A time period set by the document's workflow
- ○ Custom The length of the retention period in this profile is:

Date created ▾    +    [   ]  day(s) ▾

The action to perform at the end of this retention period is:

Move to WSS Deleted Items folder ▾

[ OK ]   [ Cancel ]

METHOD AND COMPUTER-READABLE MEDIUM FOR FORMULA-BASED DOCUMENT RETENTION

BACKGROUND OF THE INVENTION

Modern business organizations are subject to a greater degree of regulatory scrutiny than ever before. Regulatory agencies such as the Securities and Exchange Commission ("SEC") impose specific reporting and record keeping requirements on certain classes of businesses. For instance, the record keeping requirements may specify the length of time certain categories of documents must be maintained. Records may be kept longer than the specified time, but cannot be destroyed earlier than the specified time period. As an example, certain types of documents must be retained for a minimum of seven years.

Despite the regulatory requirements for maintaining documents, business organizations have a strong need to legally destroy documents. This need stems primarily from the extremely large volume of space occupied by both printed and electronic records. In order to balance the burden of maintaining documents in a manner compliant with regulatory requirements and the need to legally destroy documents, companies often define a paperwork retention schedule. A paperwork retention schedule is typically defined by a company's records manager. The paperwork retention schedule defines the period of time that various classes should be retained for. For example, a paperwork retention schedule may indicate that all contracts should be destroyed after seven years.

Traditional paperwork retention schedules are somewhat helpful in scheduling the destruction of documents. However, these schedules also suffer from a number of serious drawbacks. First, it is often difficult to practically implement a paperwork retention schedule. Moreover, because paperwork retention schedules utilize fixed destruction dates, it is possible for a document to be destroyed inadvertently. For instance, a contract may be marked for destruction after seven years. If the contract is amended or supplemented within the seven year period, the original contract may still be destroyed after the initial seven year period. This lack of flexibility when computing the retention period makes traditional paperwork retention schedules less than desirable for many organizations.

It is with respect to these considerations and others that the various embodiments of the present invention have been made.

BRIEF SUMMARY OF THE INVENTION

In accordance with the present invention, the above and other problems are solved by a method and apparatus for formula-based document retention. Through the use of the various embodiments of the invention, formulas may be specified that define the retention period for various types of documents. Because the formulas are flexible and the retention period is recalculated before any action is taken with respect to an item, the risk of inadvertent destruction of a document is minimized.

According to one aspect of the invention, a method is provided for formula-based document retention. According to the method, a retention policy is defined for an item or a class of items. The items may comprise electronic documents, electronic mail messages, or any other type of electronic data. The retention policy defines a retention formula and a retention action for the items. In particular, the retention formula is utilized to calculate a retention date for an item or class of items.

The retention formula may be based, in whole or in part, on any of the date or time properties associated with an item. As an example, a retention formula may be defined whereby the retention date for a contract is seven years from the last date upon which the contract was edited. The retention action specifies the action that should be taken on or after the retention date. For instance, a retention action may be specified for deleting an item, moving an item, archiving an item, or modifying a type for an item. Custom code may also be provided for implementing a custom action.

According to one embodiment of the invention, the retention date for one or more items is initially calculated using the retention formula for the items. A retention service may be periodically executed to identify any items having a retention date earlier than the current date. If any items are identified that have a retention date earlier than the current date, the retention service recalculates the retention date for these items utilizing the corresponding retention formula. If the recalculated retention date for any item is prior to the current date, the retention action for the item is executed. If the recalculated retention date for any item is not prior to the current date, no action is taken with respect to the item.

According to another embodiment of the invention, the retention date for each item may be recalculated each time a request is received to open the item. By recalculating the retention date each time an item is opened, the retention date is continually updated thereby reducing the number of items that the retention service must process.

According to other embodiments of the invention, the retention service is periodically executed based upon a schedule. In this manner, the retention service may be executed during off-peak periods. Additionally, in one embodiment the retention service is executed on a server computer operative to maintain a document library. In another embodiment, the retention service may be executed on a client computer.

The invention may be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 3A and 3B are screen diagrams illustrating aspects of a user interface for defining a retention policy, a retention formula, and a retention action according to one embodiment of the invention.

DETAILED DESCRIPTION OF THE INVENTION

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that run on an operating system on a server computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
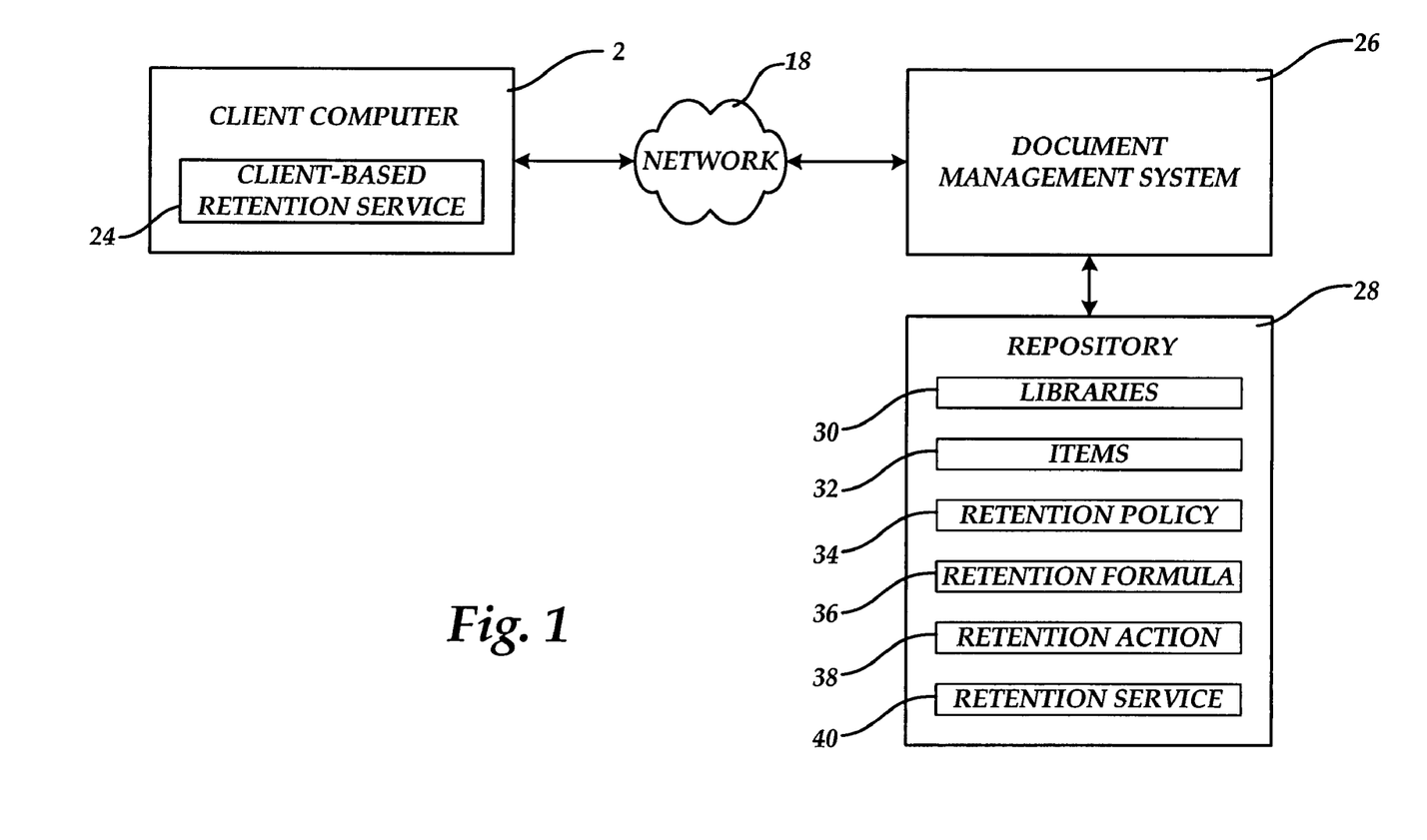
FIG. 1 is a network diagram illustrating aspects of several computer systems provided in one embodiment of the invention.

Turning now to FIG. 1, a network diagram illustrating aspects of several computer systems provided in one embodiment of the invention will be described. In particular, FIG. 1 illustrates aspects of a document management system 26 provided in an embodiment of the invention. The document management system 26 is operative to provide access to data stored in a repository 28. In particular, the document management system 26 may provide access to items 32 stored in the repository to one or more client computers 2 via a network 18. The items 32 may comprise electronic documents or any other type of electronic data file. The document management system 26 may also provide facilities for organizing the items into libraries 30, may provide collaboration services, and other document management functions as known to those skilled in the art.

As will be described in greater detail below, the document management system 26 is operative to provide formula-based document retention services. According to an embodiment of the invention, a system administrator or document manager of the document management system 26 may define a retention policy 34 for a library 30, a set of items 32, or even a single item 32 within the repository 28. The retention policy 34 defines how long the library or item must be retained prior to performing some action on the library or item.

According to one embodiment, the retention policy 34 is implemented by a retention formula 36 and a retention action 38. The retention formula 36 is a formula that may be based on an item's properties. For instance, an item's date or time properties may be utilized to define the retention formula 36 (e.g. the item should be retained until 7 years after the date specified by its creation date property). When calculated, the retention formula 36 provides a retention date for an item. The retention date defines a date on or after which the retention action 38 should be performed.

The retention action 38 comprises executable code for deleting the item, moving the item, archiving the item, or modifying the type of the item. A plug-in architecture may also be provided so that a developer can provide a plug-in for performing any arbitrary custom action. The plug-in architecture may also allow a developer to create a plug-in for specifying the retention formula as well. As will be described in greater detail below with respect to FIG. 3, the document management system 26 provides a user interface for defining the retention formula 36 and the retention action 38 for a library or item.

As will also be described in greater detail below, the document management system 26 is operative to provide a retention service 40. The retention service 40 is executed periodically according to a schedule defined by the system administrator or document manager. When executed, the retention service 40 identifies each item 32 in the repository that has an associated retention date that is prior to the current date. For each such item, the retention service 40 recalculates the retention date for the item using the associated retention formula 36. The retention service 40 then determines if the recalculated retention date is prior to the current date. If the recalculated retention date is prior to the current date, the retention service 40 will execute the retention action 38 for the item.

According to one embodiment of the invention, a client-based retention service 24 may also be provided for performing a similar function on the client computer 2. In this regard, the retention formula 36 and the retention action 38 may migrate to the client computer 2 with the associated item 32. Alternatively, the retention formula 36 and retention action 38 may be made available to the client computer 2 for any item 32 stored at the client computer 2. The client-based retention service 24 may be implemented as a part of the operating system of the client computer 2.

According to an embodiment of the invention, the document management system 26 is operative to receive a request, such as from a client computer 2, to open an item in the repository. In response to such a request, the document management system 26 is operative to recalculate the retention date for the item and store the date. By recalculating the retention date each time an item is opened, the retention date is continually updated thereby reducing the number of items that the retention service must process.

It should be appreciated that although the embodiments of the invention are described within the context of a document management system 26, the invention may be utilized with any type of computer system that stores electronic data. In particular, the embodiments of the invention may be implemented within an electronic mail server computer to perform formula-based retention of electronic mail messages. The embodiments of the invention may also be implemented in conjunction with a management system for paper files. Records may be created in the repository 28 corresponding to physical paper files and processed in the manner described herein. When an action is to be performed on the physical file, an electronic mail message or other type of notification is issued instructing the records manager to take the appropriate action.

Figure 2:
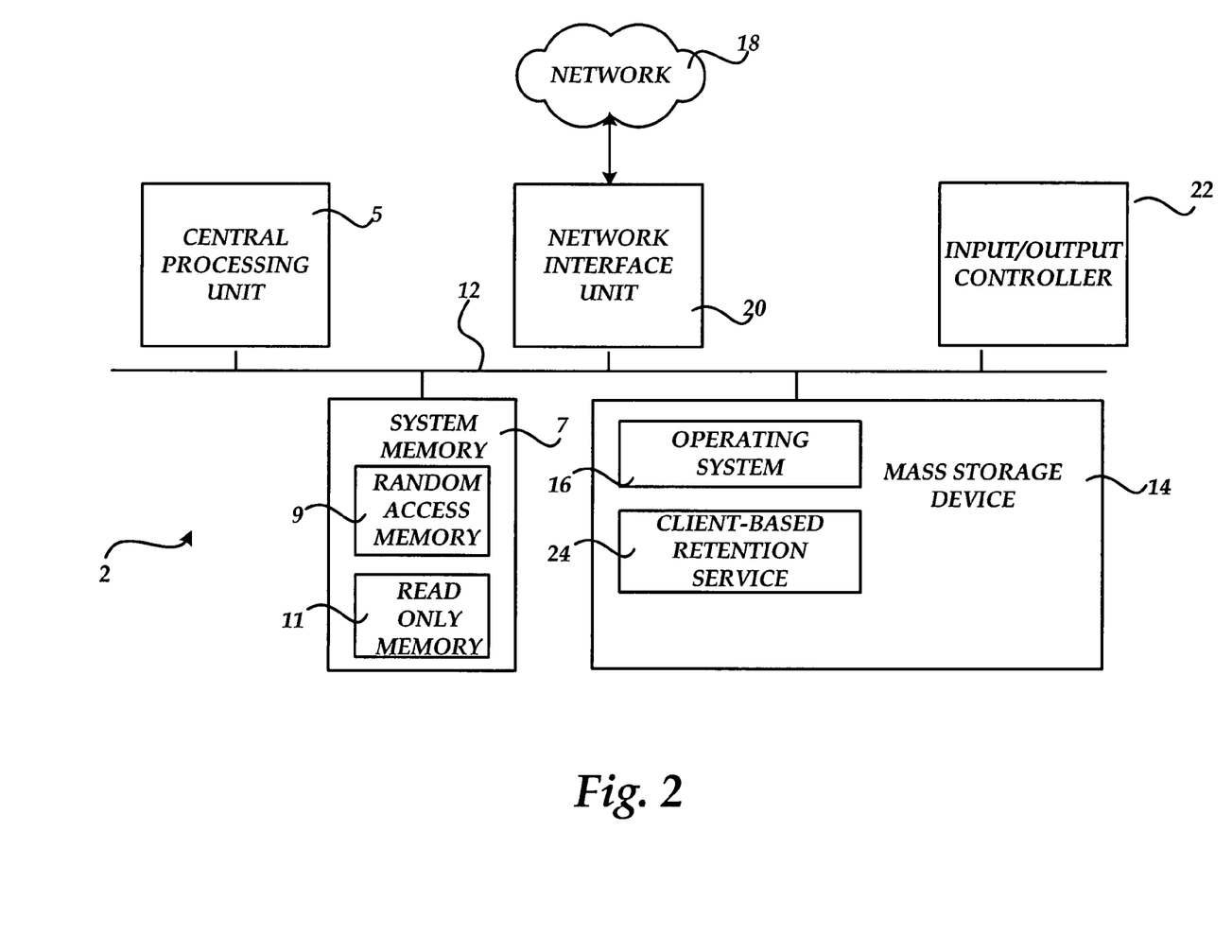
FIG. 2 is a computer system architecture diagram illustrating aspects of a client computer system utilized in and provided by the various embodiments of the invention.

Referring now to FIG. 2, an illustrative computer architecture for a client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a client-based retention service 24. As described herein, the client-based retention service 24 is operative to perform similar functions to the retention service 40, except on the client computer 2. In this manner, the retention policy for documents and other electronic data items stored at the client computer 2 may be implemented.

It should be appreciated that the document management system 26 may utilize some or all of the conventional computing components illustrated in FIG. 2. The document management system 26 may also store a number of program modules and data files needed to provide document management services. In particular, the document management system 26 may store and execute an operating system suitable for the operation of a networked server computer, program modules for providing document management services, and program modules for providing the formula-based retention services described herein. In this regard, the document management system 26 may store items 32 arranged in libraries 30. For each library 30 or item 32, a retention policy 34 may be implemented by a retention formula 36 and a retention action 38. A retention service 40 may also be periodically executed as described herein.

Turning now to FIGS. 3A and 3B, an illustrative user interface provided by the document management system 26 for defining a retention formula 36 and a retention action 38 will be described. The user interface 42 shown in FIG. 3A provides functionality for defining the type of retention period for a library. In particular, utilizing the buttons 46, a user may select that no retention period is applied to the content, that a time period is specified based upon properties associated with items in the library, that the time period is set by code associated with an item's workflow, or a time period computed by custom code that can be as arbitrarily complicated as required by the user.

If the user selects the option for setting the retention period based upon properties associated with items in the library, the user is presented with the user interface 44 shown in FIG. 3B. As shown in FIG. 3, the user interface 44 includes a drop-down menu 48 for selecting one of the date or time properties of the item. The user is then permitted to add any number of additional days or years to the date specified by the property. In this manner, a user can define a retention formula 36 based on a date specified in any of an item's properties plus a specified amount of time. Because the retention date is not based on a fixed date, the retention date may change as an item is modified.

As also shown in FIG. 3B, a drop-down menu 50 is provided for selecting a retention action 38 for the item. The retention action may delete the item, move the item, archive the item, or modify the type of an item (e.g. such as changing the type of a document from a proposal to a specification). A plug-in may also be identified in the menu 50 for performing any arbitrary custom action. In this manner, any arbitrary action may be specified for the retention action 38. Once the user has specified the retention formula 36 and the retention action 38, the user may save the settings with the item.

Figure 4:
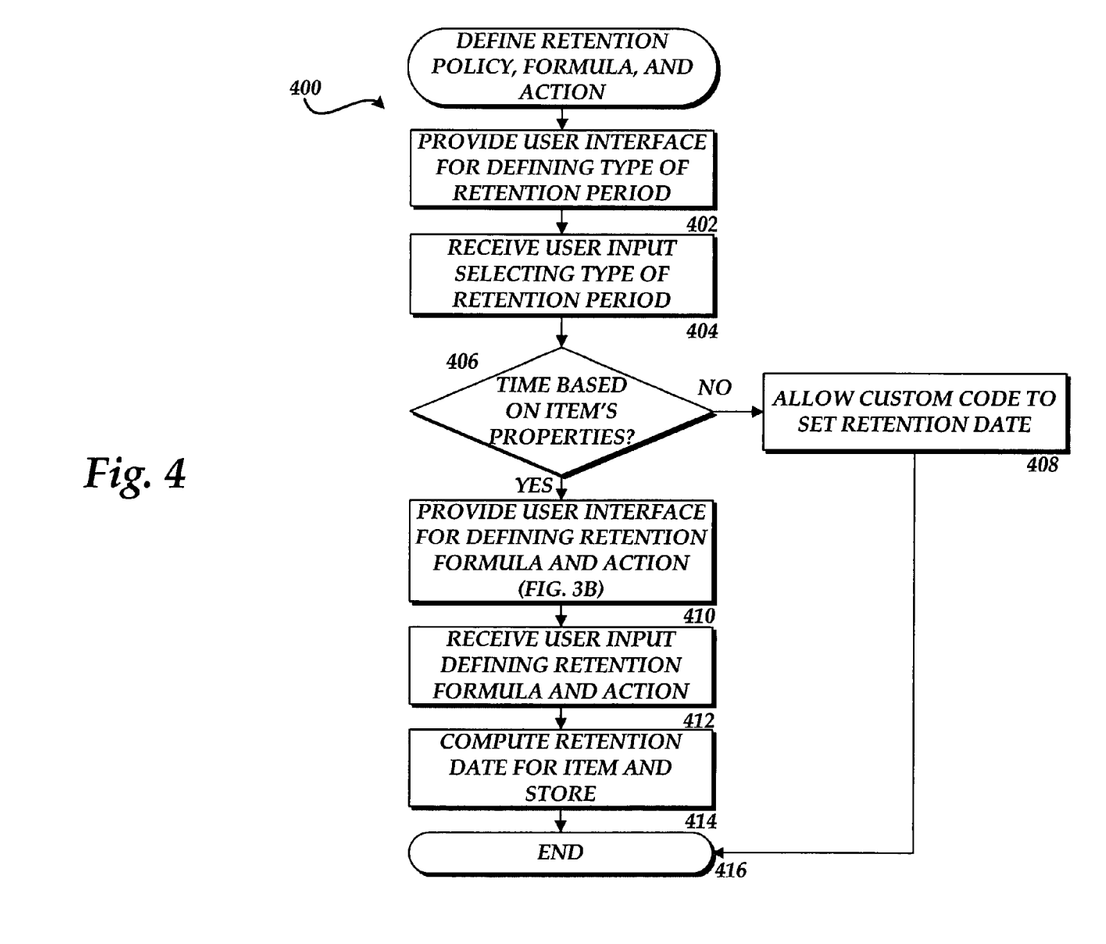
FIGS. 4-6 are flow diagrams illustrating aspects of various routines provided in an embodiment of the invention for formula-based document retention.

Referring now to FIG. 4, an illustrative routine 400 will be described illustrating a process for defining a retention policy. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-6, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 402, where the document management system 26 provides a user interface for defining the type of retention period. An illustrative user interface was described above with respect to FIG. 3A for defining the type of retention period. From operation 402, the routine 400 continues to operation 404, where user input is received selecting the type of retention period for the item. From operation 404, the routine 400 continues to operation 406, where a determination is made as to whether the type of retention period is based on the item's properties. If the type of retention period is not based on the item's properties, the routine 400 branches to operation 408. At operation 408, custom code is permitted to set the retention date for the item. From operation 408, the routine 400 continues to operation 416, where it ends.

If, at operation 406, the document management system 26 determines that the type of retention period is based on the item's properties, the routine 400 continues to operation 410. At operation 410, the document management system 26 provides a user interface for defining the retention formula 36 and the retention action 38. An illustrative user interface for specifying the retention formula 36 and the retention action 38 was described above with respect to FIG. 3B.

From operation 410, the routine 400 continues to operation 412, where user input is received defining the retention formula 36 and the retention action 38. This information is saved by the document management system 26. Once saved, the routine 400 continues to operation 414, where the document management system 26 calculates the retention date for the item utilizing the specified retention formula. The calculated retention date is saved for the item by the document management system 26. The routine 400 then continues to operation 416, where it ends.

Figure 5:
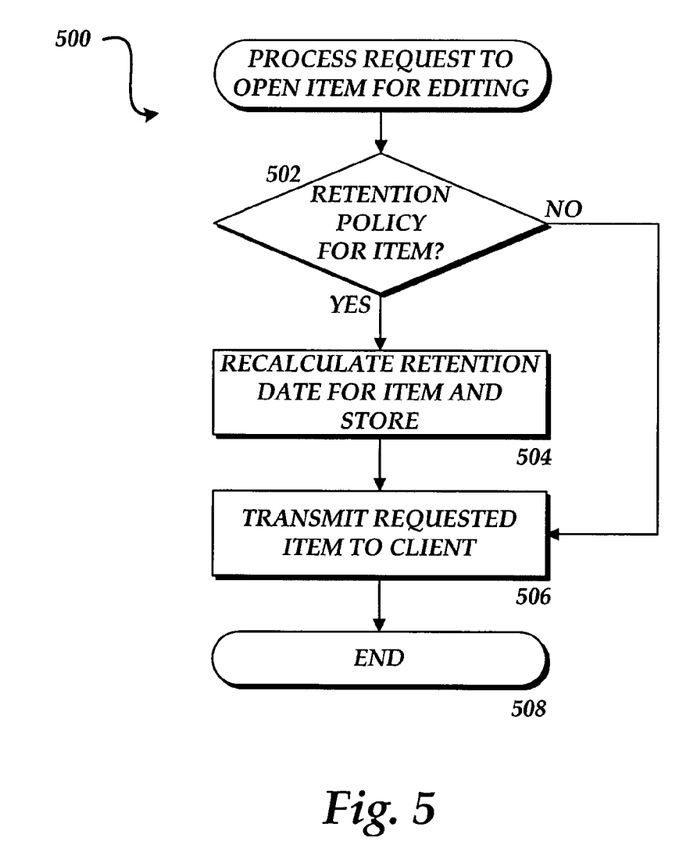

Referring now to FIG. 5, an illustrative routine 500 will be described for updating the retention date for an item in response to a request to open the item for editing or viewing. The routine 500 is executed in response to a request to open an item for editing or viewing and begins at operation 502. At operation 502, a determination is made as to whether a retention policy has been specified for the item. If no retention policy has been specified, the routine 500 branches to operation 506 as described in more detail below.

If it is determined at operation 502 that a retention policy has been specified, the routine 500 continues to operation 504, where the document management system 26 recalculates the retention date for the item based upon the retention formula 36 for the item. The recalculated retention date is then stored by the document management system 26. From operation 504, the routine 500 continues to operation 506, where the document management system 26 transmits the requested item to the requesting client for editing or viewing. The routine 500 then continues to operation 508, where it ends.

Figure 6:
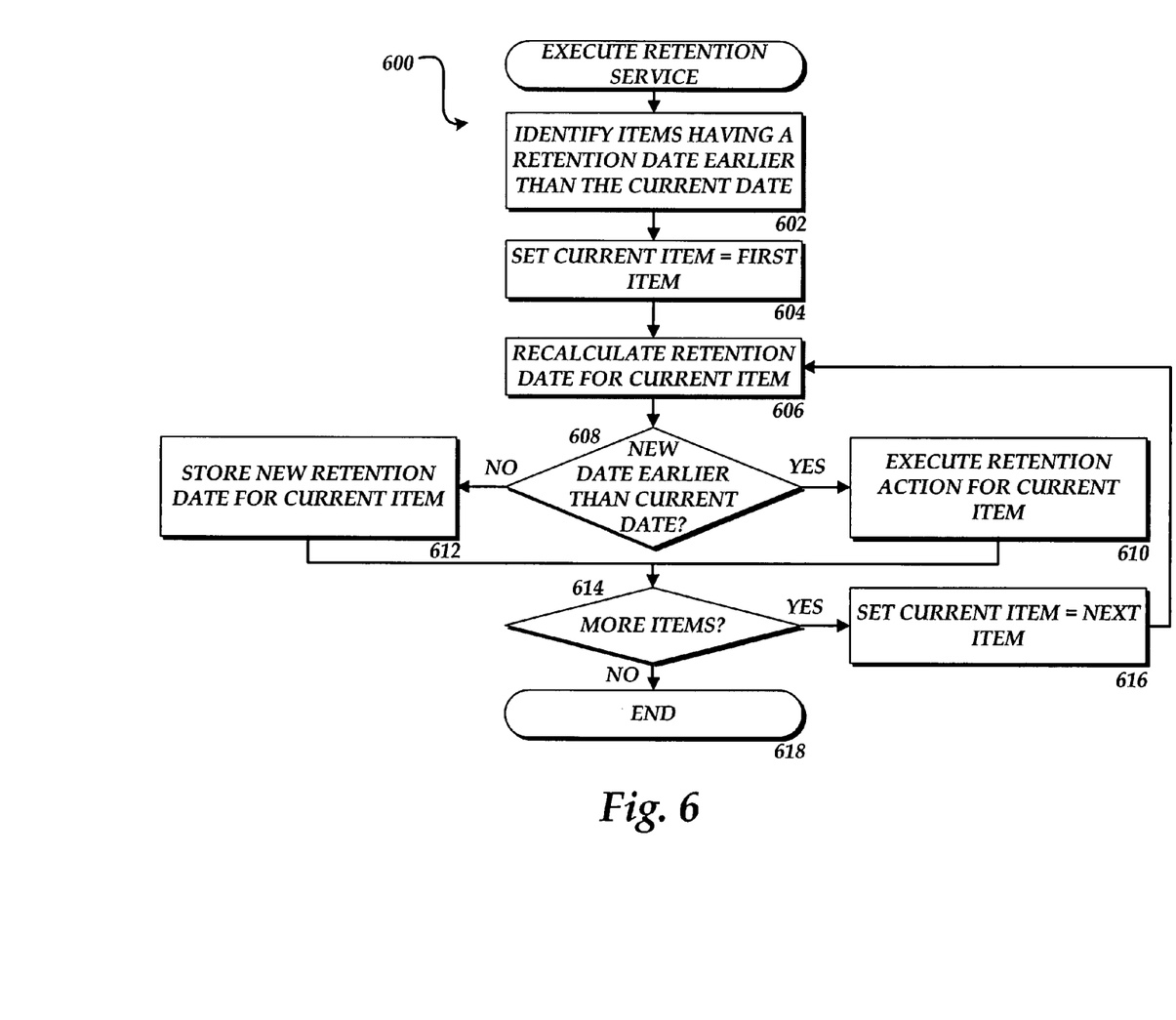

Turning now to FIG. 6, a routine 600 will be described that illustrates the execution of the retention service 40 and the client-based retention service 24. The routine 600 begins at operation 602, where the retention service 40 identifies each of the items 32 in the repository 28 having a retention date earlier than the current date. The routine 600 then continues to operation 604, where the retention service 40 sets the value of a variable for identifying the current item from the identified items to the first item. The routine 600 then continues to operation 606, where the retention service 40 recalculates the retention date for the current item utilizing the retention formula 36 for the current item.

From operation 606, the routine 600 continues to operation 608, where the retention service 40 determines whether the recalculated retention date is still earlier than the current date. If the recalculated retention date is earlier than the current date, the routine 600 branches to operation 610 where the retention action for the current item is executed. From operation 610, the routine 600 continues to operation 614.

If, at operation 608, the retention service 40 determines that the recalculated retention date for the current item is later than the current date, the routine 600 branches to operation 612. At operation 612, the retention service 40 stores the recalculated retention date for the current item for future processing. The routine 600 then continues to operation 614, where a determination is made by the retention service 40 as to whether additional items remain to be processed that have a retention date that is previous to the current date.

If additional items remain to be processed, the routine 600 branches to operation 616, where the variable identifying the current item is set to the next item. The routine 600 then branches from operation 616 to operation 606 where additional processing is performed in the manner described above. If no additional items remain to be processed, the routine 600 continues from operation 614 to operation 618, where it ends.

It should be appreciated that, according to one embodiment of the invention, documents may be identified as being exempt from the normal retention process. According to this embodiment of the invention, a user interface may be provided for indicating that one or more documents are exempt from the process of the document retention service described herein.

Based on the foregoing, it should be appreciated that the various embodiments of the invention include a method, system, apparatus, and computer-readable medium for formula-based document retention. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer-executable instructions stored thereon which, when executed by a computer, perform a method for formulated document retention, the method executed by the computer-executable instructions comprising:

receiving a retention period type defining a retention date, the retention period type comprising at least one of the following: a property time period based on at least one property of at least one item, a workflow time period set by a workflow of the at least one item, and a custom time period based on a custom code defined by a user, wherein receiving the retention period type defining the retention date comprises:

in response to the retention period type comprising the property time period based on the at least one property of the at least one item, providing a user interface comprising a drop-down menu for selecting at least one of the following: date properties and time properties of the at least one item to be associated with the property time period, permitting, within the user interface, a specification of an additional amount of time to be added to the retention period type, wherein the resultant retention period is based on the retention period type specified by the drop-down menu property selection and the specified additional amount of time, and receiving the retention period type defining the retention date that is not based on a fixed date and changes when the at least one item is modified;

periodically identifying the at least one item having the retention date prior to a current date;

recalculating the retention date based upon a retention formula, the retention formula corresponding to an item type of the at least one item and implementing a user defined retention policy associated with the at least one item, wherein recalculating the retention date based upon the retention formula comprises recalculating the retention date based on the retention formula comprising at least one of the following variables: a date and a time property;

determining if the recalculated retention date is prior to the current date;

executing a retention action for the at least one item having the recalculated retention date that is prior to the current date, wherein executing the retention action for the at least one item having the recalculated retention date that is prior to the current date comprises executing a plug-in, the plug-in being specified by the user for performing an arbitrary custom action specified for the retention action;

receiving a request to open the at least one item; and in response to the request, recalculating the retention date for the at least one item to be opened utilizing the retention formula.

2. The computer-readable storage medium of claim 1, further comprising:

calculating, prior to periodically identifying the at least one item having the associated retention date prior to the current date, the retention date for the at least one item by utilizing the retention formula.

3. The computer-readable storage medium of claim 1, further comprising:

calculating, prior to periodically identifying the at least one item having the associated retention date prior to the current date, the retention date for the at least one item by executing the plug-in.

4. The computer-readable storage medium of claim 1, wherein executing the retention action comprises deleting the at least one item.

5. The computer-readable storage medium of claim 1, wherein executing the retention action comprises moving the at least one item.

6. The computer-readable storage medium of claim 1, wherein executing the retention action comprises archiving the at least one item.

7. The computer-readable storage medium of claim 1, wherein executing the retention action comprises modifying the item type of the at least one item.

8. A method for document retention based on a retention formula, the method comprising:

receiving the retention formula for at least one item and a retention action for the at least one item, the retention formula corresponding to an item type and implementing a user defined retention policy, wherein the user defined retention policy comprises at least one of the following: a property time period for defining a retention date based on at least one property of the at least one item, a workflow time period for defining the retention date set by a workflow of the at least one item, and a custom time period for defining the retention date based on a custom code defined by a user, wherein receiving the retention period type defining the retention date comprises:

in response to the retention period type comprising the property time period based on the at least one property of the at least one item, providing a user interface comprising a drop-down menu for selecting at least one of the following: date properties and time properties of the at least one item for setting the property time period, permitting, within the user interface, a specification of an additional amount of time to be added to the retention period type, wherein the resultant retention period is based on the retention period type specified by the drop-down menu property selection and the specified additional amount of time, and receiving the retention period type defining the retention date that is not based on a fixed date and changes when the at least one item is modified;

calculating the retention date for the at least one item utilizing the retention formula; and executing a retention service operative to:

identify the at least one item having the retention date earlier than a current date, recalculate a retention date utilizing the retention formula comprising at least one of the following variables: at least one date and at least one time property, determine whether the recalculated retention date is earlier than the current date, execute a retention action for the at least one item having the recalculated retention date that is earlier than the current date, the retention action for the at least one item having the recalculated retention date that is prior to the current date being specified by the user for performing an arbitrary custom action executed by a specified plug-in, receiving a request to open the at least one item; and in response to the request, recalculating the retention date for the at least one item to be opened utilizing the retention formula.

9. The method of claim 1, wherein executing the retention service comprises executing the retention service periodically based upon a schedule.

10. The method of claim 9, wherein executing the retention service comprises executing the retention service at a server computer.

11. The method of claim 9, wherein executing the retention service comprises executing the retention service at a client computer.

12. The method of claim 1, wherein the retention service is operative to delete an item with retention action execution.

13. The method of claim 1, wherein the retention service is operative to move an item with retention action execution.

14. The method of claim 1, wherein the retention service is operative to archive an item with retention action execution.

15. The method of claim 1, wherein the retention service is operative to modify a type for an item with retention action execution.

16. A system for providing formulated document retention, the system comprising:

a memory storage; and a processing unit coupled to the memory storage, wherein the processing unit is operative to:

receive a retention period type defining a retention date, the retention period type comprising at least one of the following: a property time period based on at least one property of at least one item, a workflow time period set by a workflow of the at least one item, and a custom time period based on a custom code defined by a user, wherein at least one of the following: the retention date, the workflow time period, and the custom time period is not based on a fixed date and changes when the at least one item is modified;

providing a drop-down menu for associating the retention period type with the property time period based on the at least one property of the at least one item, the drop-down menu being employed for:

receiving a selection of at least one of the following: date properties and time properties of the at least one item, and defining a specified amount of retention time in addition to the property time period associated with the property of the at least one item, wherein the resultant retention period is based on the retention period type specified by the drop-down menu property selection and the specified additional amount of time;

calculate the retention date for the at least one item by utilizing a retention formula;

periodically identify the at least one item having the retention date, based on the retention period type, prior to a current date;

recalculate the retention date based upon the retention formula, the retention formula corresponding to an item type and implementing a user defined retention policy and operative to calculate the retention date based on at least one of the following: a date and a time property;

determine if the recalculated retention date is prior to the current date;

execute a retention action for the at least one item having the recalculated retention date that is prior to the current date, wherein the retention action is operative to delete an item, move an item, archive an item, modify a type for an item, and execute a user-specified plug-in for performing an arbitrary custom action specified for the retention action;

receive a request to open the at least one item; and in response to the request, recalculate the retention date for the at least one item to be opened utilizing the retention formula.

* * * * *

UNITED STATES PATENT AND TRADEMARK OFFICE
CERTIFICATE OF CORRECTION

| | | |
|---|---|---|
| PATENT NO. | : 7,801,863 B2 | Page 1 of 1 |
| APPLICATION NO. | : 11/072658 | |
| DATED | : September 21, 2010 | |
| INVENTOR(S) | : Kevin L. Brown et al. | |

It is certified that error appears in the above-identified patent and that said Letters Patent is hereby corrected as shown below:

In Face page, in field (75), under "Inventors" column 1, line 3, after "Adrian" delete "Brown" and insert -- Fanaru --, therefor.

Signed and Sealed this
Twenty-ninth Day of March, 2011

David J. Kappos
*Director of the United States Patent and Trademark Office*